US009928595B2

(12) United States Patent
Martinello et al.

(10) Patent No.: US 9,928,595 B2
(45) Date of Patent: Mar. 27, 2018

(54) DEVICES, SYSTEMS, AND METHODS FOR HIGH-RESOLUTION MULTI-VIEW CAMERA CALIBRATION

(71) Applicant: CANON KABUSHIKI KAISHA, Tokyo (JP)

(72) Inventors: Manuel Martinello, Mountain View, CA (US); Mahdi Nezamabadi, San Jose, CA (US); Evan Levine, Redwood City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/279,130

(22) Filed: Sep. 28, 2016

(65) Prior Publication Data

US 2017/0221210 A1  Aug. 3, 2017

(51) Int. Cl.
*G06T 7/00* (2017.01)
*H04N 13/02* (2006.01)

(52) U.S. Cl.
CPC ....... *G06T 7/0018* (2013.01); *H04N 13/0242* (2013.01); *H04N 13/0282* (2013.01); *G06T 2207/30208* (2013.01); *G06T 2207/30244* (2013.01)

(58) Field of Classification Search
CPC ......... G06T 7/0018; G06T 2207/30208; G06T 7/30244
See application file for complete search history.

(56) References Cited

U.S. PATENT DOCUMENTS

| 6,301,396 | B1 | 10/2001 | Michael |
| 7,724,379 | B2 | 5/2010 | Kawasaki |
| 8,619,144 | B1 | 12/2013 | Chang |
| 2007/0053679 | A1* | 3/2007 | Beniyama ................ G03D 9/02 396/325 |

(Continued)

FOREIGN PATENT DOCUMENTS

CN    101363712    2/2009

OTHER PUBLICATIONS

Marc Levoy et al., The Digital Michelangelo Project: 3d Scanning of Large Statues, Computer Graphics and Interactive Techniques, pp. 131-144, 2000, Jul. 2000.

(Continued)

*Primary Examiner* — Michael Teitelbaum
(74) *Attorney, Agent, or Firm* — Canon U.S.A., Inc. IP Division

(57) ABSTRACT

A system includes cameras; a rotating stage, which has an axis of rotation; one or more computer-readable media; and one or more processors that are coupled to the one or more computer-readable media, the rotating state, and the cameras. Also, the one or more processors are configured to cause the system to control the cameras to capture respective images of a calibration target in a first pose, wherein the calibration target is mounted on the rotating stage; control the rotating stage to rotate through a predetermined angular increment to a second pose; control the cameras to capture respective images of the calibration target in the second pose; and calculate a transformation between two of the (Continued)

cameras based on the respective images of the calibration target in the first pose, on the respective images of the calibration target in the second pose, and on the predetermined angular increment.

22 Claims, 12 Drawing Sheets

(56) References Cited

U.S. PATENT DOCUMENTS

| 2011/0026014 | A1 | 2/2011 | Mack et al. |
| 2012/0268579 | A1 | 10/2012 | Zhao |
| 2014/0223989 | A1* | 8/2014 | Stieff ................. G01B 11/2755 73/1.75 |

OTHER PUBLICATIONS

Gerard Medioni et al., Emerging Topics in Computer Vision, Prentice Hall PTR, Jul. 2004.
Jens Puwein et al., Robust Multiview Camera Calibration for Wide-baseline Camera Networks, Jan. 2011.
Krishnan Ramnath et al., Multi-View AAM Fitting and Construction, Mar. 2007.
Johanna Roussel et al. 3d Surface Reconstruction of Plant Seeds by Volume Calving, in British Machine Vision Conference, 2015, Sep. 2015.
E. Simioni et al., Indoor Calibration for Stereoscopic Camera STC, A New Method, International Conference on Space Optics, Oct. 2014.
Noah Snavely et al., Modeling the world from Internet photo collections, International Journal of Computer Vision, vol. 30, No. 2, pp. 189-210, 2008, Nov. 2008.
Gideon P. Stein, Accurate internal camera calibration using rotation, with analysis of sources of error, IEEE International Conference on Computer Vision, pp. 230-236,1995, Jun. 1995.
Peter F. Sturm et al., On Plane-Based Camera Calibration: A General Algorithm, Singularities, Applications, May 1999.
Roger Y. Tsai, A Versatile Camera Calibration Technique for High-Accuracy 3D Machine Vision Metrology Using Off-the-shelf TV Cameras and Lenses, IEEE Journal of Robotics and Automation, vol. RA-3, No. 4, Aug. 1987.
Aaron S Wallack et al., Calibration of Four Degree of Freedom Robotworld Modules, May 1996.
Tao Xian et al., New dynamic zoom calibration technique for a stereo-vision-based multiview 3d modeling system, Optics East, pp. 106-116, 2004, Oct. 2004.
Anthony J Yezzi et al., Structure from motion for scenes without features, IEEE Computer Vision and Pattern Recognition, vol. 1, pp. I-525-I-532, 2003, Dec. 2003.
Zhengyou Zhang, A Flexible New Technique for Camera Calibration, IEEE Transactions on Pattern Analysis and Machine Intelligence, 22(11):1330-1334, 2000 (last updated Dec. 2009).
Nicolas Boumal et al., Manopt, a matlab toolbox for optimization on manifolds, The Journal of Machine Learning Research, vol. 15, No. 1, pp. 1455-1459, Apr. 2014.
Jean-Yves Bouguet, Camera Calibration Toolbox for Matlab, downloaded Jan. 2016.
Duane C. Brown, Close-Range Camera Calibration, Jan. 1971.
T. A. Clarke et al., The Development of Camera Calibration Methods and Models, Apr. 1998.
Andrew W Fitzgibbon et al., Automatic 3d model construction for turn-table sequences, Nov. 1998.
Jan-Michael Frahm et al., Robust camera calibration from images and rotation data, Pattern Recognition, Lecture Notes in Computer Science, vol. 2781, pp. 249-256, 2003, Sep. 2003.
Jan-Michael Frahm et al., "Camera calibration with known rotation," IEEE International Conference on Computer Vision, pp. 1418-1425, 2003, Oct. 2003.
Yasutaka Furukawa et al., Accurate camera calibration from multi-view stereo and bundle adjustment, International Journal of Computer Vision, vol. 84, No. 3, pp. 257-268, 2009, Apr. 2009.
James Gregson, Multiview Optical Tomography Datasets Overview, Mar. 2012.
Richard I. Hartley, Self-calibration from multiple views with a rotating camera, European Conference on Computer Vision, pp. 471-478, 1994, May 1994.
Janne Heikkila et al., A four-step camera calibration procedure with implicit image correction, Computer Vision and Pattern Recognition, pp. 1106-1112, 1997, Jun. 1997.
Daniel P. Huttenlocher et al., Comparing images using the hausdorff distance, IEEE Transaction on Pattern Analysis and Machine Intelligence, vol. 15, No. 9, pp. 437-442, 1993, Sep. 1993.
Ferenc Kahlesz et al., Easy-to-use calibration of multiple-camera setups, Workshop on Camera Calibration Methods for Computer Vision Systems, pp. 1-8, 2007, Mar. 2007.
Kenichi Kanatani, Calibration of Ultra-Wide Fisheye Lens Cameras by Eigenvalue Minimization, Memoirs of the Faculty of Engineering, Okayama University, vol. 46, pp. 10-20, Jan. 2012.
Seth Koterba et al., Multi-view AAM Fitting and Camera Calibration, IEEE International Conference on Computer Vision, vol. 1, pp. 511-518, 2005, Oct. 2005.
Aldo Laurentini, The visual hull concept for silhouette-based image understanding, IEEE Transactions on Pattern Analysis and Machine Intelligence, vol. 16, No. 2, pp. 150-162, 1994, Feb. 1994.

* cited by examiner

DEVICES, SYSTEMS, AND METHODS FOR HIGH-RESOLUTION MULTI-VIEW CAMERA CALIBRATION

CROSS-REFERENCE TO RELATED APPLICATIONS

This application claims the benefit of U.S. Provisional Application No. 62/289,821, which was filed on Feb. 1, 2016.

BACKGROUND

Technical Field

This application generally relates to calibrating multiple cameras.

Background

In a multi-view camera system, a calibration target is placed in the region of overlap between the fields of view of the cameras, and the relative positions of the cameras are determined by comparing the cameras' views of the calibration target.

SUMMARY

Some embodiments of a system comprise two or more cameras; a rotating stage, which has an axis of rotation; one or more computer-readable media; and one or more processors that are coupled to the one or more computer-readable media, the rotating state, and the two or more cameras. The one or more processors are configured to cause the system to control the two or more cameras to capture respective images of a calibration target in a first pose, wherein the calibration target is mounted on the rotating stage; control the rotating stage to rotate through a predetermined angular increment to a second pose; control the two or more cameras to capture respective images of the calibration target in the second pose; and calculate a transformation between two cameras of the two or more cameras based on the respective images of the calibration target in the first pose, on the respective images of the calibration target in the second pose, and on the predetermined angular increment.

Some embodiments of a method comprise obtaining a first image of a calibration target that was captured by a first camera while the calibration target was in a first pose, wherein the calibration target was located on a rotating stage; obtaining a second image of the calibration target that was captured by a second camera while the calibration target was in the first pose; rotating the calibration target and the rotating stage through an angular increment to a second pose; obtaining a third image of the calibration target that was captured by the first camera while the calibration target was in the second pose; obtaining a fourth image of the calibration target that was captured by the second camera while the calibration target was in the second pose; and calculating a transformation between the first camera and the second camera based on the first image, on the second image, on the third image, on the fourth image, and on the angular increment.

Some embodiments of one or more computer-readable storage media store computer-executable instructions that, when executed by one or more computing devices, cause the computing devices to perform operations that comprise controlling two or more cameras to capture respective images of a calibration target in a first pose, wherein the calibration target is mounted on a rotating stage, and wherein the first pose has a first angle; controlling the two or more cameras to capture respective images of the calibration target in a second pose, wherein the second pose has a second angle that is different from the first angle; and calculating a transformation between two cameras of the two or more cameras based on the respective images of the calibration target in the first pose, on the respective images of the calibration target in the second pose, and on a difference between the first angle and the second angle.

DETAILED DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
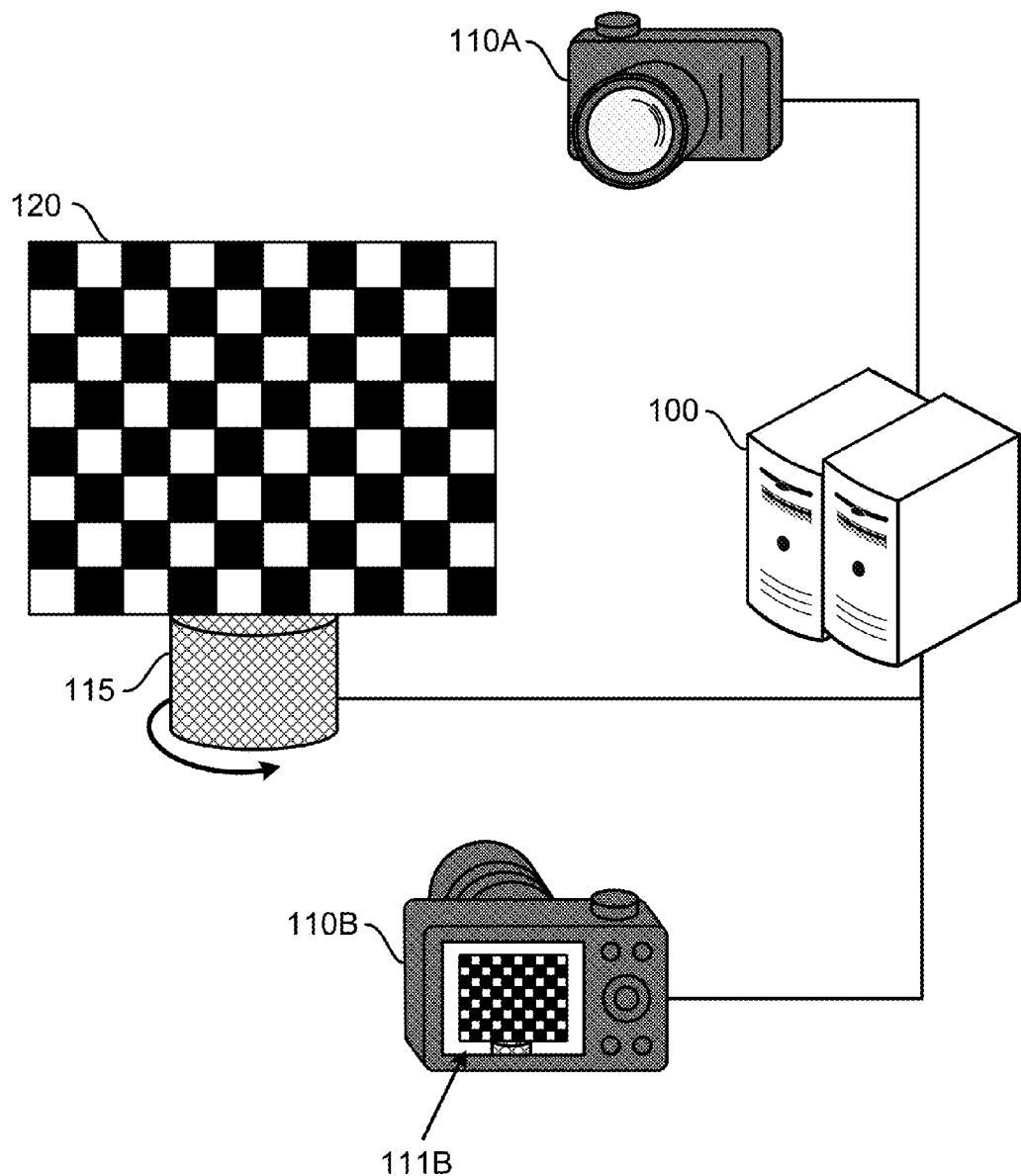
FIG. 1 illustrates an example embodiment of a system for multi-view camera calibration.

FIG. 1 illustrates an example embodiment of a system for multi-view camera calibration. The system includes one or more specially-configured computing devices 100; two cameras 110, which include a first camera 110A and a second camera 110B; and a rotating stage 115. Other embodiments may include one camera or more than two cameras 110.

The rotating stage 115 moves a calibration target 120, which is mounted on the rotating stage 115, through different poses. The poses may include respective poses where the calibration target faces each camera 110 in the system. The rotating stage 115 may use pure rotation and may use known angular increments to constrain the poses of the calibration target 120. Each pose includes a respective position and a respective orientation, and the orientation may be described as an angle. Also, examples of the calibration target 120 include a checkerboard (as shown in FIG. 1), a grid of orthogonal lines, another pattern, and an elliptical shape. The cameras 110 each have a respective view of the calibration target 120, for example the view 111B that the second camera 110B has of the calibration target 120. This view 111B is an example of a pose where the calibration target faces the second camera 110B.

During camera calibration, the system calculates the extrinsic parameters of the cameras 110, and the system may determine the intrinsic parameters of each camera 110. The intrinsic parameters describe characteristics of the camera, such as the focal length, lens distortion, principal point, and skew of the camera, and the intrinsic parameters may be used to correct distortion in images. The extrinsic parameters (the rigid transformations between the cameras 110) describe the relative poses of the cameras 110. Also, the system may determine (e.g., obtain, calculate) the intrinsic parameters before calculating the extrinsic parameters.

The calibration target 120 and the rotating stage 115 are placed in a region of overlap between the fields of view of the cameras 110. The cameras 110 each capture one or more images (e.g., two-dimensional (2D) images) of the calibration target 120 at a first pose. Then the rotating stage 115 rotates the calibration target 120 to a second pose, and the cameras 110 each capture one or more images of the calibration target 120 in the second pose. The combination of rotating and image capturing can be repeated multiple times. Also, some embodiments, for example embodiments that mount the cameras 110 on a rotating platform that encircles the calibration target 120, rotate the cameras 110 around the calibration target 120 instead of rotating the calibration target 120.

The dimensions of the calibration target 120 are related to its projection in an image, and the specially-configured computing devices 100 use these projections in the images to calculate the extrinsic parameters. The extrinsic parameters may be described by a three-dimensional (3D) rigid transformation (rotation and translation) from the calibration target 120 to the camera 110 or from one camera 110 to another camera 110 (e.g., from the first camera 110A to the second camera 110B). If the system includes multiple cameras 110, such as the system in FIG. 1, respective extrinsic parameters (the relative poses) can be calculated for each of the cameras 110.

Figure 2:
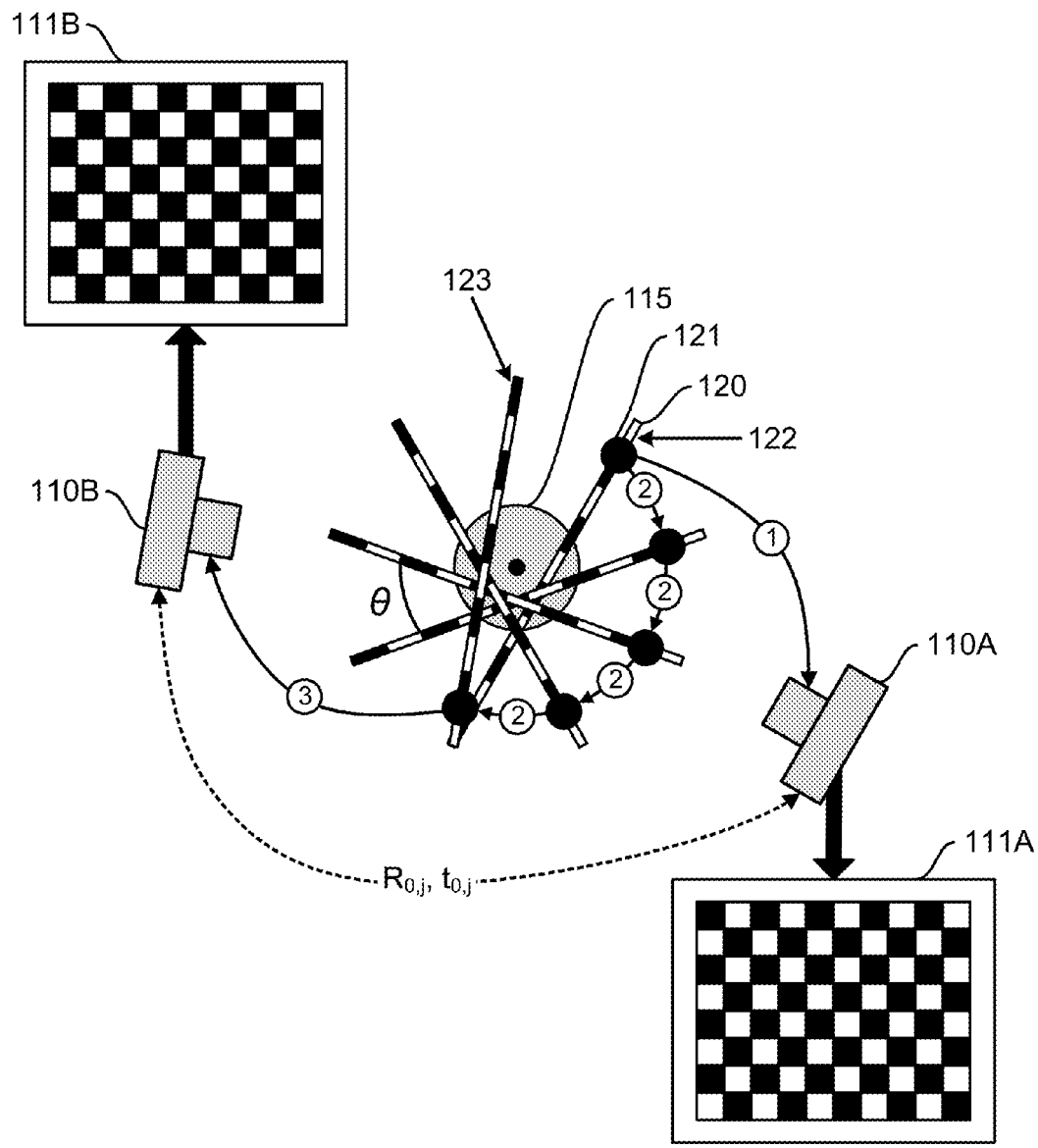
FIG. 2 illustrates an overhead view of the calibration target and the two cameras in the example embodiment of a system for multi-view camera calibration.

FIG. 2 illustrates an overhead view of the calibration target 120 and the two cameras 110 in the example embodiment of a system for multi-view camera calibration. The rotating stage 115 rotates the calibration target 120 through five poses. When the rotating stage 115 rotates between the five poses, it rotates in the same angular increment (40° in this example). Thus, the angle $\theta_p$ between two adjacent poses is the same as the angle $\theta_p$ between any other two adjacent poses. For example, if the angle $\theta_p$ between two adjacent poses is 40°, then the angle $\theta_p$ between any other two adjacent poses is 40°. Although in operation the angular increments may have some minor variations (e.g., one angular increment may be 40.001° and another may be) 40.0015°, the calculations assume that the angular increments are identical.

While the calibration target 120 is in each of the five poses, both of the cameras 110 capture an image of the calibration target 120. Thus, in this example, the system captures ten images of the calibration target 120. Next, the one or more computing devices 110 fit each pose of the calibration target 120 to the captured images. If the calibration target 120 includes reference points (e.g., an intersection of two lines, a corner of a checkerboard pattern, a marking), then their projected locations in the captured images are detected and used as data for fitting each pose of the calibration target 120 to the images.

Afterwards, the one or more computing devices 100 compute the rigid transformations (rotation and translation) between the cameras 110. This computation may include calculating, explicitly or implicitly, the respective camera-to-axis transformations between each camera 110 and the axis of rotation of the calibration target 120 (which is the same as the axis of rotation of the rotating stage 115). Thus, the system may describe a camera's respective relative pose by using a rigid transformation that indicates rotation and translation.

Because the uncertainty of the position of a reference point 121 may increase as the calibration target 120 is rotated so that the face of the calibration target 120 is no longer perpendicular to the optical axis of a camera 110 (e.g., see FIGS. 4 and 5), the system may compute the rigid transformation between each camera 110 and the calibration target 120 using the image in which the calibration target 120 is at a pose of the available poses (this example has five available poses) in which the face of the calibration target 120 is closest to being perpendicular to the optical axis of the respective camera 110. In this image, the calibration target 120 will occupy at least as much of the view 111 of the respective camera 110 as the calibration target 120 will occupy in the other images.

For example, when calculating the transformation between the first camera 110A and the second camera 110B, the system may calculate a transformation (labeled 1) between the first camera 110A and the calibration target 120 using images that include the image that was captured by the first camera 110A while the calibration target 120 was in a first pose 122. When the calibration target 120 is in the first pose 122, it occupies at least at much of the field of view 111A of the first camera 110A as it occupies in the images in which the calibration target 120 was in the other poses.

Also, when calculating the transformation between the first camera 110A and the second camera 110B, the system may calculate a transformation (labeled 3) between the second camera 110B and the calibration target 120 using images that include the image that was captured by the second camera 110B while the calibration target 120 was in a fifth pose 123. When the calibration target 120 is in the fifth pose 123, it occupies at least at much of the field of view 111B of the second camera 110B as it occupies in the images in which the calibration target 120 was in the other poses.

Additionally, when calculating the transformation between the first camera 110A and the second camera 110B, the one or more specially-configured computing devices 100 may calculate (explicitly or implicitly) the rigid transformations between each of the five poses of the calibration target 120. Because the angle $\theta_p$ between any two adjacent poses is identical or nearly identical, the one or more specially-configured computing devices 100 can calculate one rigid transformation (labeled 2) to describe the transformation between any two adjacent poses.

Therefore, when calculating the transformation between the two cameras 110, the one or more specially-configured computing devices 100 may explicitly or implicitly (i.e., the particular transformation is not directly output although the directly output transformation is based on the particular transformation) calculate the first transformation, the second transformation, and the third transformation.

Furthermore, as noted above, a rotating stage 115 may not move in perfectly accurate or precise angular increments. Thus, the angular increment $\theta_p$ between any two adjacent poses may not be perfectly identical. However, the image errors caused by an error in the angular increment may be inconsequential. Consider a camera 110 with horizontal resolution $N_y$ and a focal length in pixels $f_y$. The camera 110 is at a distance z from the rotating stage. A calibration target 120 of maximum dimensions R is placed on the rotating stage 115. Let $\Delta\theta_p$ be the error in the angle of the rotating stage 115. If the error $\Delta\theta_p \approx 0.2°$, then, in a captured image, the maximum error that the rotating stage 115 causes in the location of the calibration-target reference points is $$\frac{\Delta\theta_p R N_y}{2(z - R/2)\tan^{-1}(N_y/2f_y)}$$

pixels, which is 1.1 pixels in the image.

Accordingly, the one or more specially-configured computing devices 100 can calculate the extrinsic parameters, which include the transformation between the first camera 110A and the second camera 110B. Because the transformations between the different poses are known, even if the cameras 110 have only a small overlap in their fields of view, the one or more specially-configured computing devices 100 can still calculate the extrinsic parameters of the cameras 110.

Some embodiments of the system can calibrate both the extrinsic and the intrinsic parameters of a single camera 110. Also, some embodiments of the system integrate the calibration of the rotating stage 115 with the calibration of the camera 110.

Thus, the system uses a known angular increment (e.g., 15°, 20°, 22°) of the calibration target 120 on the rotating stage 115 to calculate the extrinsic parameters of one or more cameras 110. Additionally, the system calculates, either explicitly or implicitly, N+1 transformations (N=the number of cameras) regardless of the number of poses of the calibration target 120, and the system calculates the N+1 transformations and other extrinsic parameters using an optimization function that is constrained based on the known angular increment (angle of rotation). Moreover, the cameras 110 do not need to have overlapping views of a face of the calibration target 120 (e.g., do not need to have overlapping views of a checkerboard pattern on a calibration target 120), and the system can use the extrinsic parameters to measure new objects.

Figure 3:
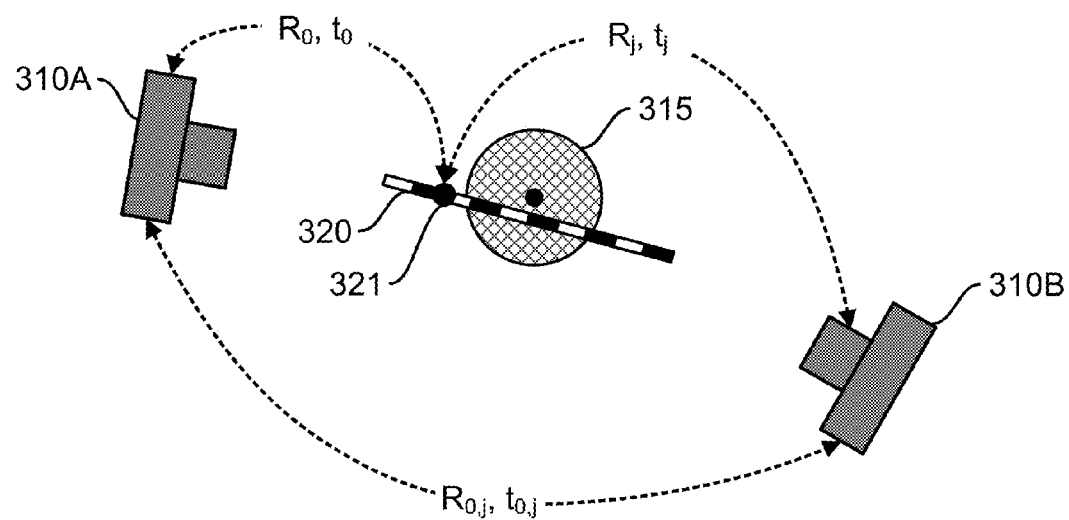
FIG. 3 is an overhead view that illustrates the rigid transformations between two cameras and a calibration target.

FIG. 3 is an overhead view that illustrates the rigid transformations (rotation and translation) between two cameras 310 and a calibration target 320. When the specially-configured computing devices of a system compute the transformation $R_{o,j}, t_{o,j}$ between the two cameras 310, the computing devices may compute the following: (1) a transformation $R_0$, $t_0$ from the first camera 310A to the calibration target 320 (e.g., the reference point 321 on the calibration target 320, the axis of rotation of the calibration target 320), and (2) a transformation $R_j$, $t_j$ from the second camera 310B to the calibration target 320 (e.g., the reference point 321 on the calibration target 320, the axis of rotation of the calibration target 320).

When the cameras 310 are positioned close to each other and are approximately parallel, in almost any pose of the calibration target 320 the reference point 321 is visible to all cameras 310 and can be used to estimate the extrinsic parameters of the cameras 310. However, in some systems, for example systems where the cameras 310 do not share a large region of overlap in their fields of view, the calibration target 320 projects at an oblique angle into one or more of the cameras 310, making detection of the reference point 321 inaccurate.

Figure 4:
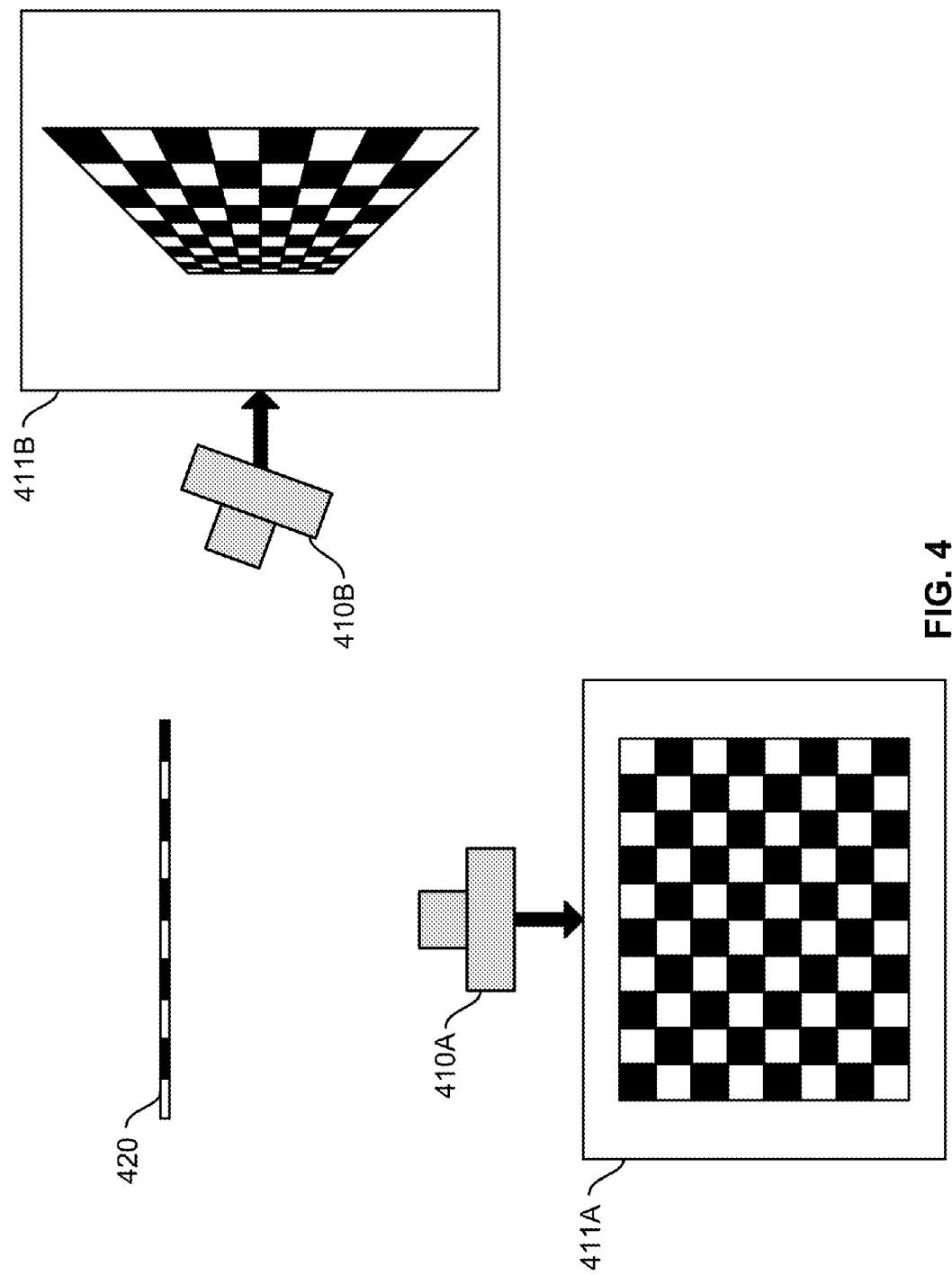
FIG. 4 illustrates an overhead view of two cameras and a calibration target.

FIG. 4 illustrates an overhead view of two cameras 410 and a calibration target 420. The two cameras 410, which include a first camera 410A and a second camera 410B, are oriented nearly perpendicular to each other. Also, the long axis of the calibration target 420 is nearly perpendicular to the optical axis of the first camera 410A. Thus, the calibration target 420 occupies nearly the entire view 411A that the first camera 410A has of the calibration target 420, and all of the points on the face of the calibration target 420 are approximately the same distance from the first camera 410A (the distances fall into a relatively narrow range).

However, the longitudinal axis of the calibration target 420 is nearly parallel to the optical axis of the second camera 410B. Thus, in the view 411B that the second camera 410B has of the calibration target 420, the points on the near side of the face of the calibration target 420 are much closer to the second camera 410B than the points on the opposite side of the calibration target 420. Accordingly, the calibration target 420 projects at an oblique angle onto the sensor of second camera 410B. And the uncertainty of the position of a reference point on the calibration target 420 increases with the angle between the face of the calibration target 420 and the sensor of the camera 410.

Figure 5A:
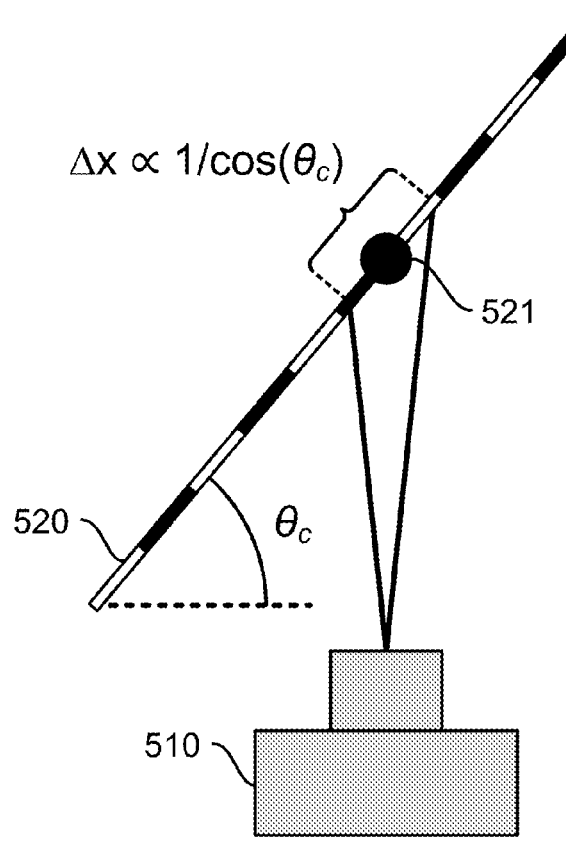
FIGS. 5A and 5B illustrate the relationship between the uncertainty of a position of a reference point on a calibration target and the angle between the face of the calibration target and a camera.
Figure 5B:
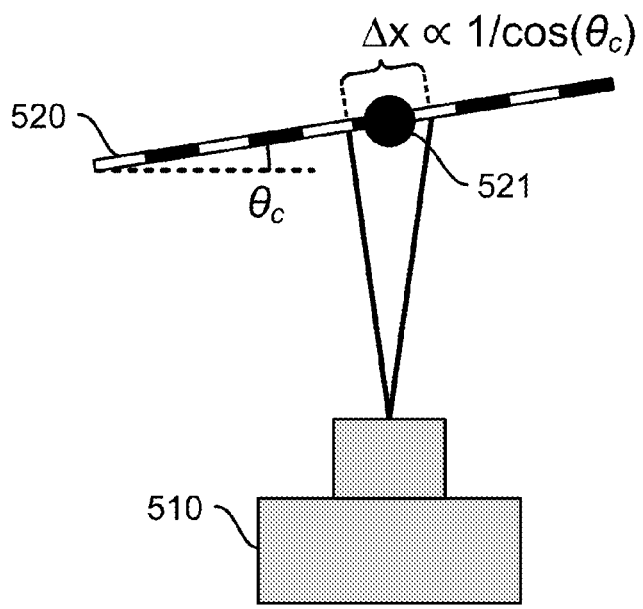

FIGS. 5A and 5B illustrate the relationship between the uncertainty of a position of a reference point on a calibration target and the angle between the face of the calibration target and a camera. Every reference point 521 has an uncertainty $\Delta x$ that increases with the angle $\theta_c$ between the face of the calibration target 520 and the camera 510 (note that the angle $\theta_c$ increases as the angle between the optical axis of the camera and the longitudinal axis of the calibration target 520 decreases). Accordingly, $$\Delta x \propto \frac{1}{\cos(\theta_c)}. \qquad (1)$$

FIG. 5A shows that when the angle $\theta_c$ between the face of the calibration target 520 and the camera 510 is larger, the uncertainty $\Delta x$ is larger. However, in FIG. 5B the angle $\theta_c$ between the face of the calibration target 520 and the camera 510 is smaller than the angle $\theta_c$ in FIG. 5A. Thus, the uncertainty $\Delta x$ in FIG. 5B is smaller than the uncertainty in FIG. 5A.

Figure 6:
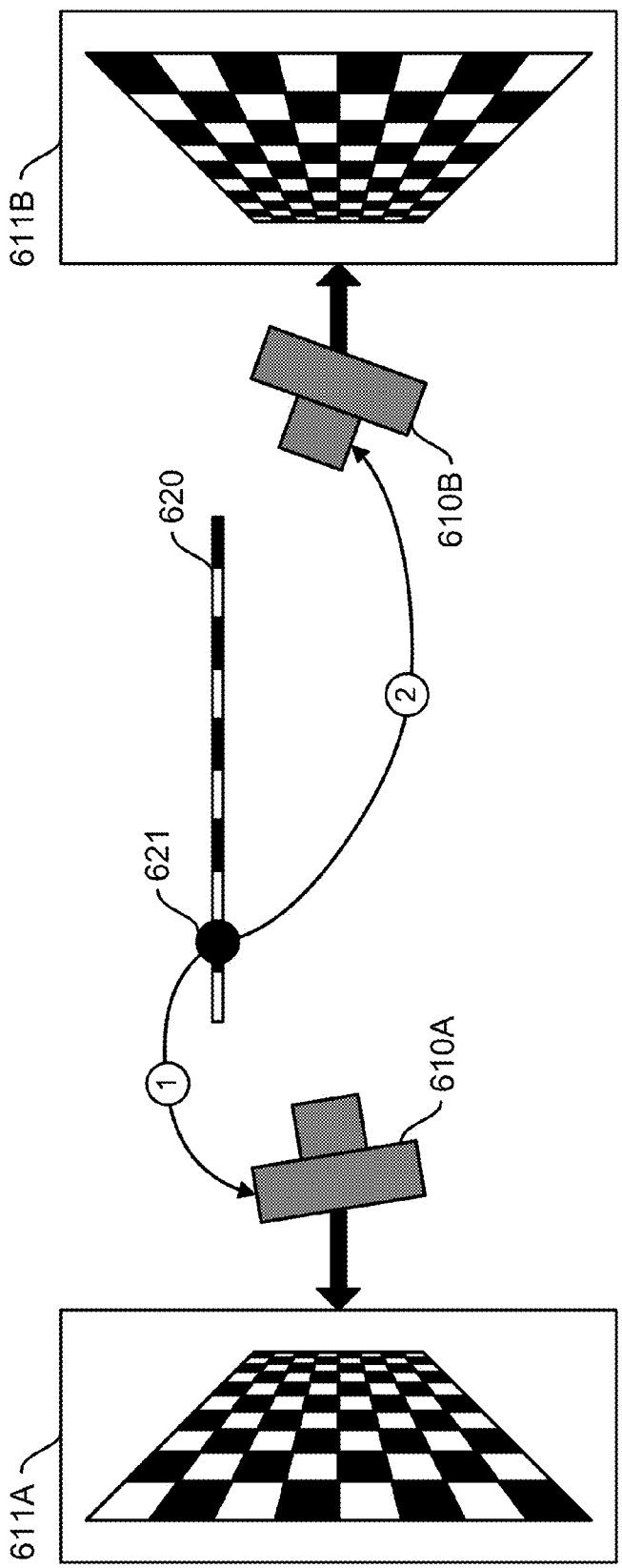
FIG. 6 illustrates an overhead view of an example embodiment of rigid transformations between a reference point on a calibration target and two cameras.

FIG. 6 illustrates an overhead view of an example embodiment of rigid transformations between a reference point on a calibration target and two cameras. The first camera 610A is positioned closer to the side of the calibration target 620 that the reference point 621. Because of this, in the view 611A that the first camera 610A has of the calibration target 620, the edge of the calibration target 620 that is closest to the reference point 621 appears to be larger than the opposite edge.

However, the second camera 610B is positioned closer to the edge of the calibration target 620 that is farthest from the reference point 621. Because of this, in the view 611B that the second camera 610B has of the calibration target 620, the edge of the calibration target 620 that is closest to the reference point 621 appears to be smaller than the opposite edge.

To determine the relative poses of the first camera 610A and the second camera 610B, a system for multi-view camera calibration uses an image of the view 611A that the first camera 610A has of the calibration target 620 and an image of the view 611B that the second camera 610B has of the calibration target 620 to calculate the transformations between the first camera 610A and the second camera 610B. This may include calculating the transformation (numbered 1) between the first camera 610A and the reference point 621 and the transformation (numbered 2) between the second camera 610B and the reference point 621.

Capturing more images of the calibration target 620 at different poses provides more data but introduces additional parameters. Furthermore, because of the errors that may be caused by the angle $\theta_c$ between the face of the calibration target 620 and the first camera 610A and the angle $\theta_c$ between the face of the calibration target 620 and the second camera 610B, the accuracy of the calculated rigid transformations may be improved using images that were captured when the angles $\theta_c$ were smaller.

Figure 7A:
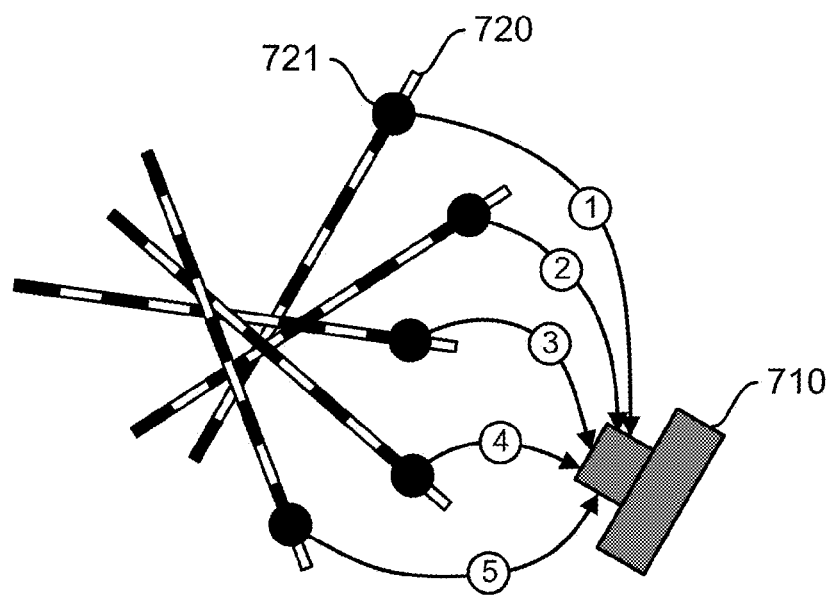
FIGS. 7A and 7B illustrate overhead views of example embodiments of rigid transformations between a reference point on a calibration target and a camera.
Figure 7B:
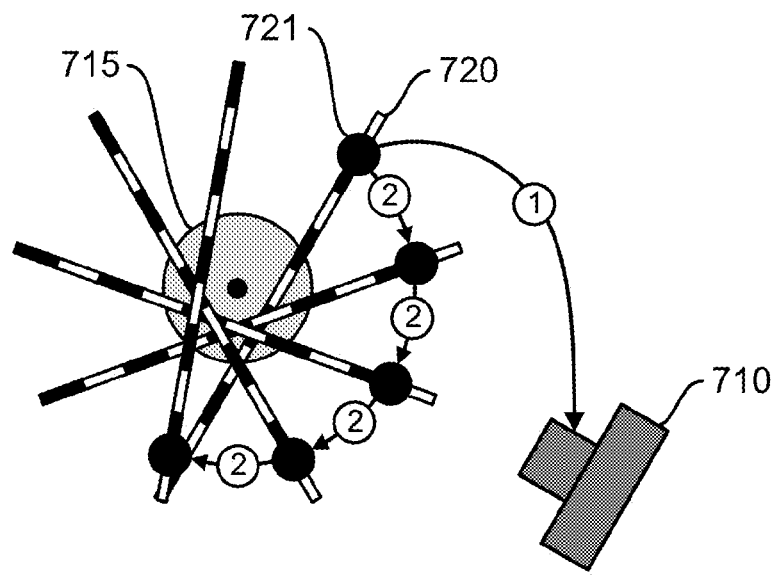

FIGS. 7A and 7B illustrate overhead views of example embodiments of rigid transformations between a reference point on a calibration target and a camera. In FIG. 7A, a camera 710 captures five images of a calibration target 720, and, in the images, the angles $\theta_c$ between the calibration target 720 and the camera 710 are different. Also, the system for multi-view camera calibration does not have any additional information about the angles $\theta_c$ or about the angular increments $\theta_p$ between the poses. Thus, a system for multi-view camera calibration calculates six different transformations between the camera 710 and the calibration target 720 and fits a large number of parameters without having any information about the poses of the calibration target 720.

In FIG. 7B, a camera 710 captures five images of a calibration target 720. After an image is captured, the system for multi-view camera calibration causes the rotating stage 715 to repeatedly rotate the calibration target 720 through a known angular increment $\theta_p$ to a new pose, and the system controls and records the angular increment $\theta_p$ (the angle of rotation). The camera 710 then captures an image of the calibration target 720 in the new pose. Therefore, in the images of the calibration target 720, the angles $\theta_p$ between the poses are known. In this example, the system captures five images and rotates the calibration target 720 four times. Furthermore, in FIG. 7B, the system needs to calculate only two transformations to describe a transformation between the camera 710 and any pose of the calibration target 720. In contrast, in FIG. 7A, the system need to calculate one transformation for each pose of the calibration target 720. Also, in FIG. B, the known angular increment $\theta_p$ can be used to constrain the poses of the calibration target 720.

Thus, in the embodiment in FIG. 7B, the number of unknown parameters is fixed and does not scale with the number of images, unlike the embodiment in FIG. 7A, where six parameters are used for each pose of the calibration target.

Figure 8:
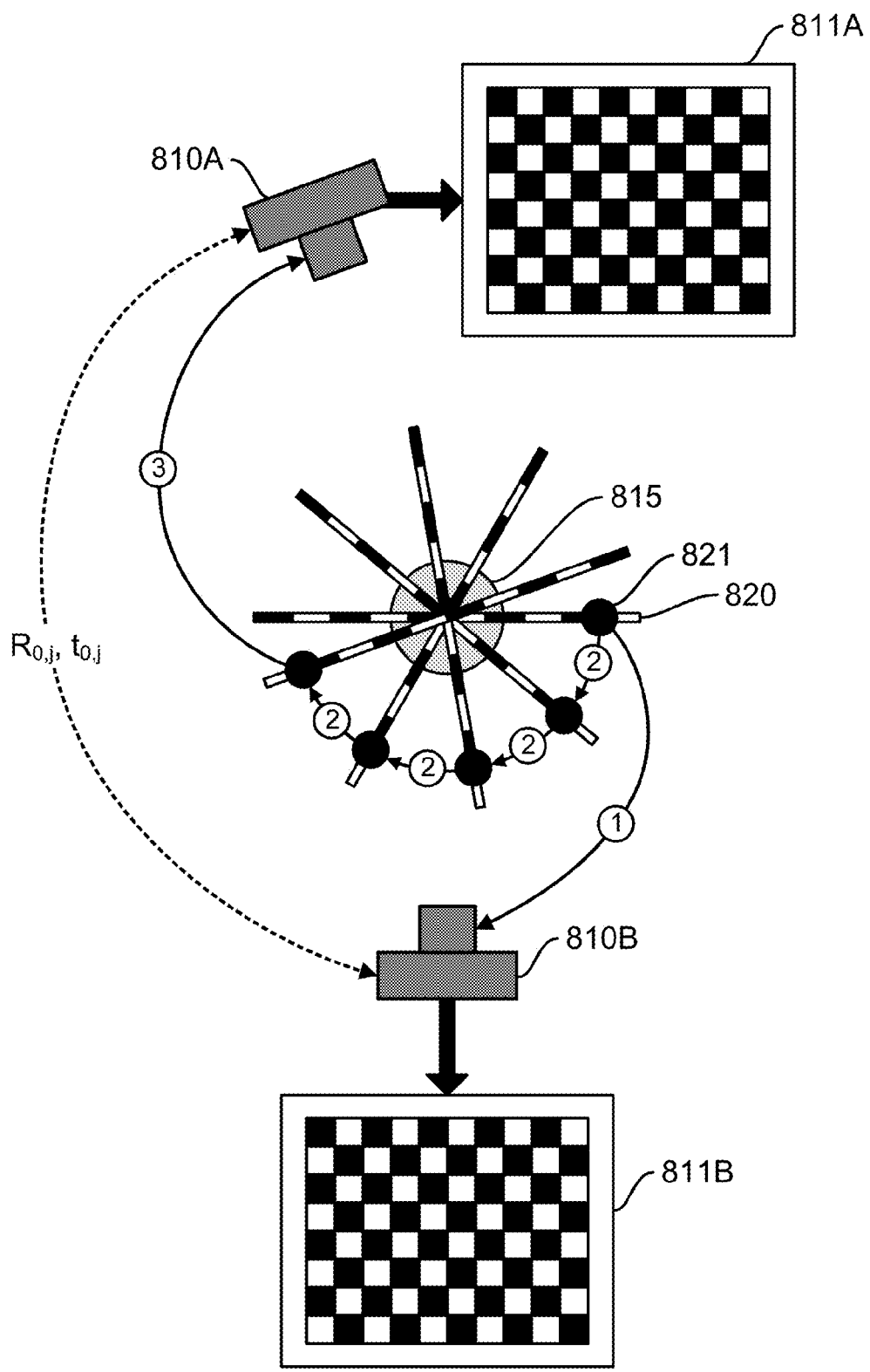
FIG. 8 illustrates an overhead view of example embodiments of rigid transformations between a reference point on a calibration target and two cameras, between adjacent poses of the calibration target, and between the two cameras.

FIG. 8 illustrates an overhead view of example embodiments of rigid transformations between a reference point of a calibration target and two cameras, between adjacent poses of the calibration target, and between the two cameras. The calibration target 820 in this example is more closely aligned with the axis of rotation of the rotating stage 815 than the calibration target 120 in FIG. 2. In this example, each camera 810 (i.e., the first camera 810A and the second camera 810B) captures five images of a calibration target 820. After each camera 810 captures an image of the calibration target 820 in a pose, the system causes the rotating stage 815 to rotate the calibration target 820 through a known angular increment $\theta_p$ to a new pose, and the system controls and records the angular increment $\theta_p$. The cameras 810 each then capture an image of the calibration target 820 in the new pose. Therefore, in the images of the calibration target 820, the angles between the poses of the calibration target 820 are known. In this example, the system captures ten images (five per camera 810) and rotates the calibration target 820 four times.

Thus, some embodiments of a system for multi-view camera calibration use a rotating stage 815 to rotate a calibration target 820 through an angular increment $\theta_p$ N times and use one or more cameras 810 to capture images of the calibration target 820 in the different poses.

Consequently, the extrinsic parameters can be defined by the position and axis of rotation of calibration target 820 and, for each camera 810, a transformation to an arbitrary pose of the calibration target 820. Also, the known angular increment $\theta_p$ can be used to constrain the calibration target's poses.

Moreover, each camera 810 can capture an image of the calibration target 820 when the calibration target has a small angle $\theta_c$ between the face of the calibration target 820 and the camera 810. Thus, the first camera 810A can capture an image of the calibration target 820 when the calibration target 820 fills more of the first camera's field of view 811A. Likewise, the second camera 810B can capture an image of the calibration target 820 when the calibration target 820 fills more of the second camera's field of view 811B. This can reduce the uncertainty $\Delta x$ of the position of the reference point 821.

Figure 9:
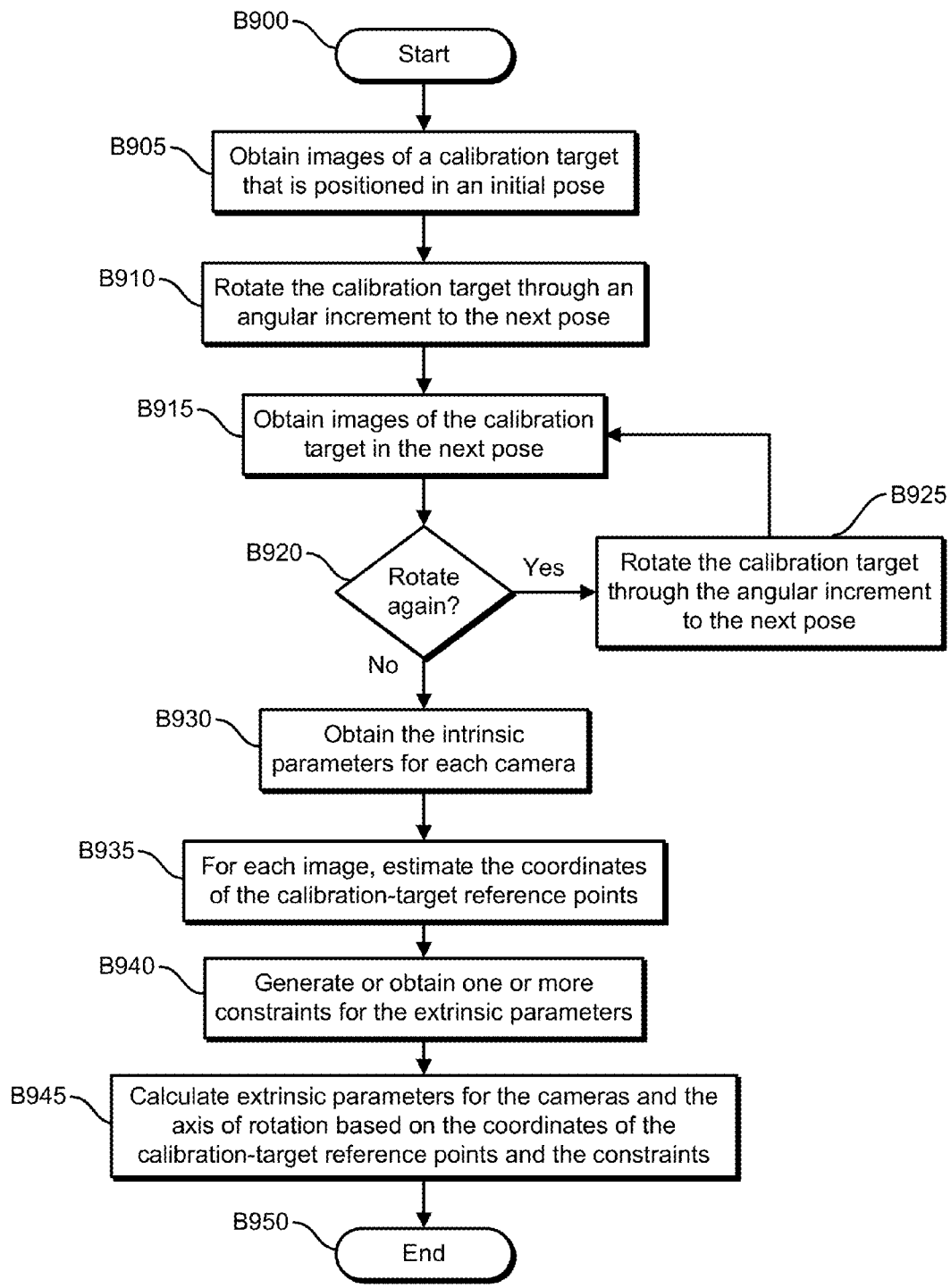
FIG. 9 illustrates an example embodiment of an operational flow for calibrating multiple cameras.

FIG. 9 illustrates an example embodiment of an operational flow for calibrating multiple cameras. The blocks of this operational flow and the other operational flows that are described herein may be performed by one or more devices, for example the devices and systems that are described herein. Also, although the operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

The flow starts in block B900 and then proceeds to block B905. In block B905, a calibration system obtains images of a calibration target that is positioned in an initial pose. Next, in block B910, the system rotates the calibration target through an angular increment to the next pose. Although perfect accuracy or precision may be impossible, during every rotation of the calibration target, the system may attempt to keep the rotation as close to the angular increment as possible. The flow then moves to block B915, where the system obtains images of the calibration target in the next pose.

The flow then proceeds to block B920, where the system determines if the calibration target should be rotated again. If yes (block B920=yes), then the flow moves to block B925, wherein the system rotates the calibration target through the angular increment to the next pose, and then the flow returns to block B915. If not (block B920=no), then the flow moves to block B930, where the system obtains the intrinsic parameters for each camera.

Next, in block B935, the system estimates the coordinates of the calibration-target reference points. The flow then moves to block B940, where the system generates or obtains one or more constraints for the extrinsic parameters. For example, the system can identify the known angle between adjacent poses of the calibration target as a constraint.

The flow then proceeds to block B945, where the system calculates the extrinsic parameters of the cameras (the relative poses of the cameras, which include the relative positions and orientations) based on the coordinates of the calibration-target reference points and the constraints. This calculation may include calculating camera-to-calibration-target transformations or pose-to-pose transformations for the poses of the calibration target. To calculate the extrinsic parameters, the system may perform an optimization operation, for example as described in equations (7)-(13), which are presented below. Finally, the flow ends in block B950.

Some embodiments of the optimization operation can be described by the following formulation. Let $\{\theta_0, \theta_1, \ldots, \theta_{N_R-1}\}$ denote the angular increments of $N_R$ rotations of a calibration target that was placed on a rotating stage, rotated $N_R$ times, and captured in successive image captures. Each angular increment describes the difference between the orientations of two adjacent poses of the calibration target. The pose of the calibration target relative to the axis of rotation of the rotating stage does not depend on the angle of the calibration target, and the angular increments are known and are equal or approximately equal. This known information reduces the dimensionality of the calibration operation to a smaller number of unknown extrinsic parameters: the axis of rotation of the calibration target (five unknowns) and the relative poses of all cameras (six unknowns per camera).

Let $A_c$ denote the set of poses where the reference points on a calibration target are visible to camera c, and $A_c \subseteq \{0, 1, \ldots, N_R-1\}$. The estimated reference-point locations for a pose's angle a, where $a \in A_c$, are denoted by $m_{a,c}$. The estimated reference-point locations $m_{a,c}$ have 3D coordinates Y in the coordinate system of the calibration target. Let $X_a$ denote the 3D coordinates of the reference-point locations at angle a in the coordinate system of the reference camera, camera 0. The pose that includes the first rotation angle can be described by a rigid transformation ($R_0, t_0$), which relates the coordinate systems of the calibration target and camera 0, for example as described by the following:

$$X_1 = R_0 X_{ref} + t_0 1^T. \quad (2)$$

For angles $a \in \{0, \ldots, N_R-1\}$, the poses of two consecutive angles, angles a−1 and a, are related by a transformation that is denoted by ($R_{\theta_a}, t_{\theta_a}$). Also, $$X_a = R_{\theta_a} X_{a-1} + t_{\theta_a} 1^T, \quad (3)$$

where $X_{a-1}$ is taken to be $X_{N_R-1}$. The translation $t_\theta$ can also be parameterized by an arbitrary point on the axis of the rotating stage $X_0$, for example as described by $$t_{\theta_a} = (I - R_{\theta_a}) X_0, \quad (4)$$

where I is the identity matrix. Also, the rotation $R_{\theta_a}$ can be described by the following axis-angle representation:

$$R_{\theta_a} = \exp(i\theta_a [k]_x), \quad (5)$$

where $i = \sqrt{-1}$, where k is a unit vector that describes the axis of rotation of the rotating stage, where the rotation angle $\theta_a$ is a known acquisition parameter, and where $$[k]_x = \begin{bmatrix} 0 & -k_3 & k_2 \\ k_3 & 0 & -k_1 \\ -k_2 & k_1 & 0 \end{bmatrix}. \quad (6)$$

The multi-view extrinsic parameters are composed of transformations between camera 0 and camera j, where $j \in \{1, 2, \ldots, N_c-1\}$, and where $N_c$ is the number of cameras. The multi-view extrinsic parameters may be described by ($R_{0,j}, t_{0,j}$) (for example, as shown in FIG. 3).

Calculating the extrinsic parameters (i.e., performing camera calibration) may amount to fitting the extrinsic parameters $\epsilon = (k, X_0, R_0, t_0)$, a total of eleven free parameters, subject to the constraint that $R_0$ must be a rotation matrix (belonging to the rotation group SO(3)), to equations (2), (3), and (5).

$$\{\hat{X}_a\}_{a \in \{0, \ldots, N_R-1\}}$$

denotes estimates of the calibration target's reference-point locations $$\{X_a\}_{a \in \{0, \ldots, N_R-1\}}.$$

In some embodiments, (e.g., embodiment that include a maximum-likelihood framework where detected image points are assumed to be corrupted by independent and identically distributed Gaussian noise), the optimization operation can be described by the following:

$$P1: \underset{\epsilon, R_{0,c}, t_{0,c}}{\operatorname{argmin}} \sum_{c=0}^{N_c-1} \sum_{a \in A_c} \left\| m_{a,c} - \hat{m}_c(R_{c,0} \hat{X}_a + t_{c,0} 1^T) \right\|_F^2 \quad (7)$$

subject to $\hat{X}_a = R_{\theta_a} \hat{X}_{a-1} + (I - R_{\theta_a}) X_0,$ (8)

$$\hat{X}_0 = R_0 Y + t_0 1^T, \quad (9)$$

$$\|k\|_2 = 1, \quad (10)$$

$$R_{\theta_a} = \exp(i\theta_a [k]_x), \quad (11)$$

$$R_0 \in SO(3), \text{ and} \quad (12)$$

$$R_{c,0} \in SO(3), c = \{0, \ldots, N_c - 1\}. \quad (13)$$

For example, P1 may be solved using a nonlinear optimization procedure based on a trust region solver implemented in the Manopt toolbox for optimization on manifolds.

TABLE 1

Notation guide for equations (2)-(13).

| Variable | Definition |
|---|---|
| Y | Coordinates of reference points |
| $N_C$ | Number of cameras |
| $N_R$ | Number of rotations of the calibration target |
| $A_c$ | Set of all angles visible to camera c |
| $\hat{m}_c(\cdot)$ | Projection of a 3D point (in camera c coordinates) onto the image sensor of camera c; contains all intrinsic parameters for camera c |
| $m_{a,c}$ | Detected reference-point locations (in pixels) for camera c at angle $a \in A_c$ |
| $X_a$ | Locations of reference points at rotating angle a |
| $\hat{X}_a$ | Estimates of reference-point locations at rotation angle a (an estimate of $X_a$) |
| $R_0, t_0$ | Pose of target at angle 0 |

TABLE 1-continued

Notation guide for equations (2)-(13).

| Variable | Definition |
| --- | --- |
| k,θ | Axis-angles representation of the rotating-stage increment |
| $X_0$ | Arbitrary point on the axis of the rotating stage |
| ϵ | Set of extrinsic parameters k, $X_0$, $R_0$, and $t_0$ |
| $R_{\theta a}$, $t_{\theta a}$ | Transformation from one pose of a calibration target to the next pose of the calibration target (i.e., the transformation between adjacent poses) |
| $R_{i,j}$, $t_{i,j}$ | Transformation from camera i to camera j |

In one embodiment, a calibration procedure was used to estimate intrinsic camera parameters from 20 poses of a planar checkerboard calibration target (a checkerboard pattern with 6.35 mm squares). The estimated focal lengths were $f_y$=53.6 mm, $f_x$=53.8 mm for a first camera and $f_y$=54.4 mm, $f_x$=54.6 for a second camera. The resolution of the first camera was 5496×3670, and the resolution of the second camera was 5796×3870.

After the intrinsic parameters were estimated, the extrinsic camera parameters were calculated. Images of the calibration target were acquired, with angular increments of $\theta_a$=2.5° for all angles a, by the first camera and the second camera. Poses that had angles for which the reference points were not distinguishable within 50 pixels were excluded, leaving poses swept over approximately 135° of rotation for each camera. The cameras were respectively placed about 32 cm and 43 cm from the rotating stage and were separated by 120°. The one or more specially-configured computing devices calculated the extrinsic parameters according to equation (7).

Also, as a baseline, another technique was used to obtain the extrinsic parameters. Images of the calibration target in 21 different poses in the region of overlap of the fields of view of the two cameras were captured. For each pose (e.g., as shown in FIG. 7A), a computing device calculated the extrinsic parameters for each camera and multiplied them to obtain one respective estimate of the multi-view extrinsic parameters of the pose. The medians of the respective multi-view extrinsic parameters of the poses were then chosen as the final estimates of the extrinsic parameters.

Images of a specular sphere with a diameter of 50.8 mm were captured by both cameras, and the quantitative accuracy of the reconstructions was assessed based on the Hausdorff distances between surfaces. The distance from a point x to a surface S in Euclidean space is defined as $$d(x, S) = \inf_{x' \in S} \|x - x'\|. \quad (14)$$

The Hausdorff distance between two surfaces $S_1$ and $S_2$ is defined as $$d_H(S_1, S_2) = \max\left\{\sup_{x \in S_1} d(x, S_2), \sup_{x \in S_2} d(x, S_1)\right\}. \quad (15)$$

The Hausdorff distance from each point on the reconstructed sphere to the corresponding point on the reference sphere was computed after translating the reference sphere to minimize its Hausdorff distance to the reconstruction.

Figure 10:
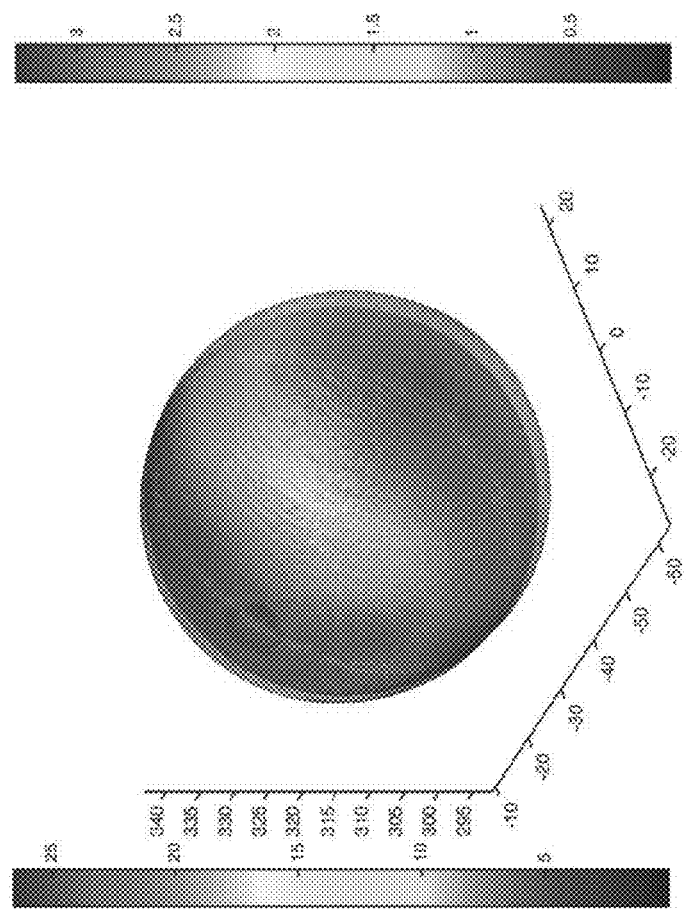
FIG. 10 illustrates maps of the Hausdorff distances for two calculations of extrinsic parameters.
Figure 10:
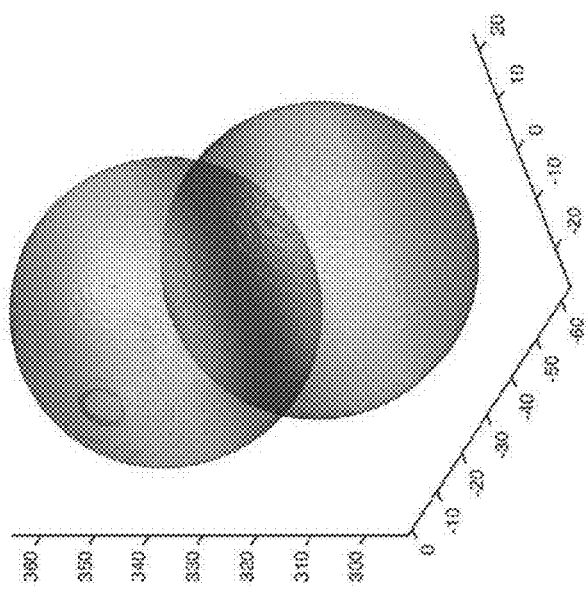

For the multi-view calibration, multi-view extrinsic parameters derived with the baseline and with the test resulted in misalignment of the two reconstructions by a Hausdorff distance of 26.57 mm and 3.31 mm, respectively. Maps of the Hausdorff distances for the two calculations of the extrinsic parameters are shown in FIG. 10. Note that the calibration used a common axis of rotation, which guaranteed alignment of the spheres in the plane orthogonal to the axis of rotation. Thus, these reconstructions can be misaligned only along the axis of rotation.

Figure 11:
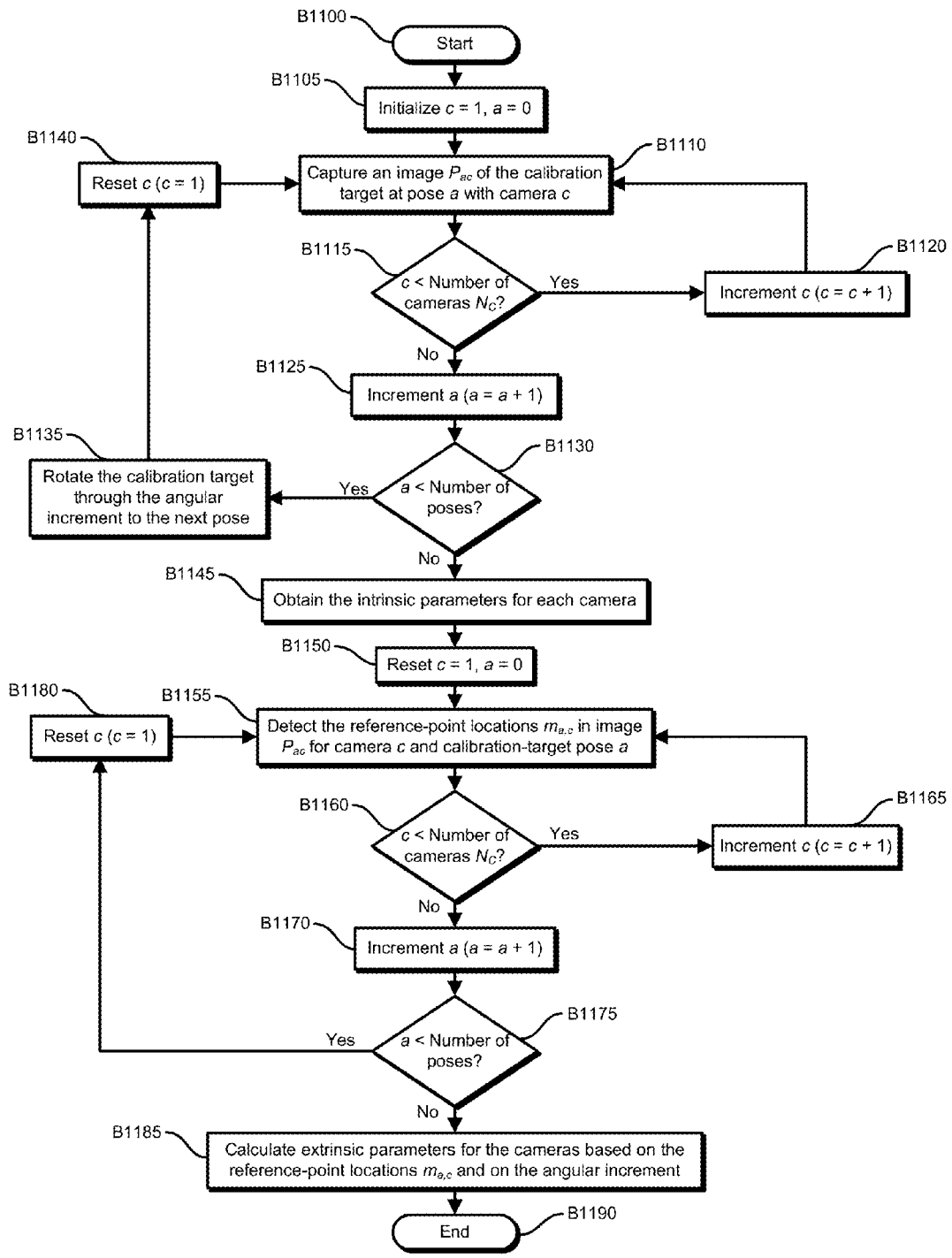
FIG. 11 illustrates an example embodiment of an operational flow for calibrating multiple cameras.

FIG. 11 illustrates an example embodiment of an operational flow for calibrating multiple cameras. The flow starts in block B1100, and then moves to block B1105. In block B1105, c is set to 1 and a is set to 0. Next, in block B1110, an image $P_{ac}$ of the calibration target at pose a is captured with camera c. The flow then moves to block B1115, where is it determined if c is less than the number of cameras $N_c$ (c<$N_c$). If yes (block B1115=yes), then the flow moves to block B1120, where c is incremented, and then the flow returns to block B1110. If not (block B1115=no), then the flow moves to block B1130.

In block B1130, it is determined if a is less than the desired number of poses. If yes (block B1130=yes), then the flow moves to block B1135. In block B1135 the calibration target is rotated through the angular increment to the next pose. The flow then moves to block B1140, where c is reset to 1, and then the flow returns to block B1110. However, if a is not less than the desired number of poses (block B1130=no), then the flow proceeds to block B1145.

In block B1145, the intrinsic parameters are obtained for each camera. Next, in block B1150, c is reset to 1, and a is reset to 0. The flow then moves to block B1155, where the reference-point locations $m_{a,c}$ in image $P_{ac}$ for camera c at calibration-target pose a are detected. Next, in block B1160, it is determined if c is less than the number of cameras $N_C$. If yes (block B1160=yes), then the flow moves to block B1165, where c is incremented, and then the flow returns to block B1155. If not (block B1160=no), then the flow proceeds to block B1170, where a is incremented.

Next, in block B1175, it is determined if a is less than the number of poses. If yes (block B1175=yes), then the flow moves to block B1180, where c is reset to 1, and the flow then returns to block B1155. If not (block B1175=no), then the flow proceeds to block B1185. In block B1185, extrinsic parameters for the cameras are calculated based on the reference-point locations $m_{a,c}$ and on the angular increment, for example according to equations (7)-(13). The flow then ends in block B1190.

Figure 12:
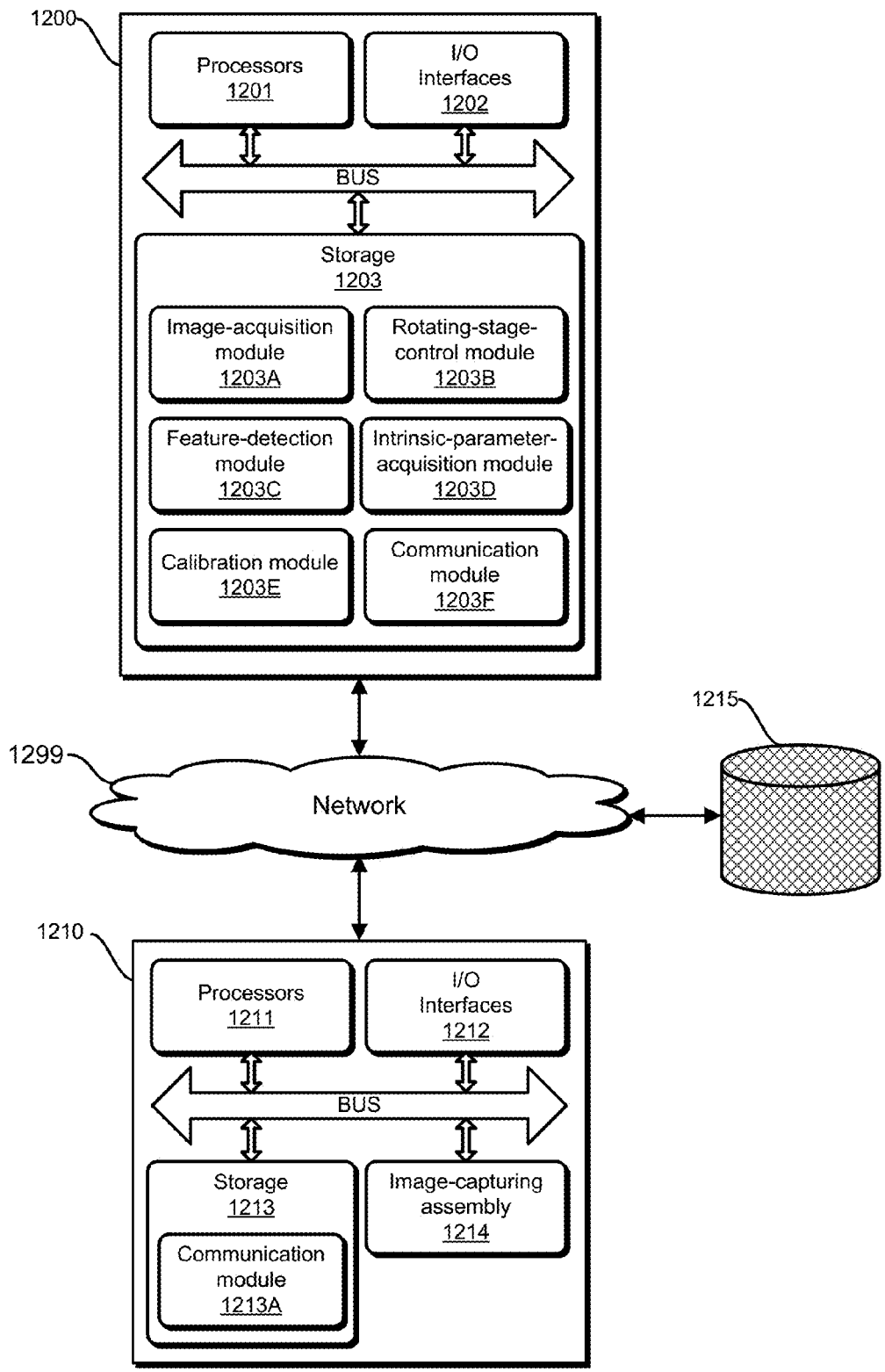
FIG. 12 illustrates an example embodiment of a system for calibrating multiple cameras.

FIG. 12 illustrates an example embodiment of a system for calibrating multiple cameras. The system includes a calibration device 1200, which is a specially-configured computing device; a camera 1210; and a rotating stage 1215. Some embodiments include one or more additional cameras 1210 or calibration devices 1200. In this embodiment, the devices communicate by means of one or more networks 1299, which may include a wired network, a wireless network, a LAN, a WAN, a MAN, and a PAN. Also, in some embodiments the devices communicate by means of other wired or wireless channels.

The calibration device 1200 includes one or more processors 1201, one or more I/O interfaces 1202, and storage 1203. Also, the hardware components of the calibration device 1200 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1201 include one or more central processing units (CPUs), which include microprocessors (e.g., a single core microprocessor, a multi-core microprocessor); graphics processing units (GPUs); or other electronic circuitry. The one or more processors 1201 are configured to read and perform computer-executable instructions, such as instructions that are stored in the storage 1203 (e.g., ROM, RAM, a module). The I/O interfaces 1202 include communication interfaces to input and output devices, which may include a keyboard, a display device, a mouse, a printing device, a touch screen, a light pen, an optical-storage device, a scanner, a microphone, the camera 1210, a drive, a controller (e.g., a joystick, a control pad), and a network interface controller.

The storage 1203 includes one or more computer-readable storage media. As used herein, a computer-readable storage medium, in contrast to a mere transitory, propagating signal per se, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1203, which may include both ROM and RAM, can store computer-readable data or computer-executable instructions.

The calibration device 1200 also includes an image-acquisition module 1203A, a rotating-stage-control module 1203B, a feature-detection module 1203C, an intrinsic-parameter-acquisition module 1203D, a calibration module 1203E, and a communication module 1203F. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 1203.

The image-acquisition module 1203A includes instructions that, when executed, or circuits that, when activated, cause the calibration device 1200 to obtain one or more images from the camera 1210 and store the obtained images in the storage 1203. The image-acquisition module 1203A may use the communication module 1203F to communicate with the camera 1210.

The rotating-stage-control module 1203B includes instructions that, when executed, or circuits that, when activated, cause the calibration device 1200 to command the rotating stage 1215 to rotate through a specified angular increment, which may be indicated by a number of degrees or angular steps.

The feature-detection module 1203C includes instructions that, when executed, or circuits that, when activated, cause the calibration device 1200 to detect the locations of reference points in an image of a calibration target.

The intrinsic-parameter-acquisition module 1203D includes instructions that, when executed, or circuits that, when activated, cause the calibration device 1200 to obtain intrinsic parameters for the camera 1210, for example from a location in the storage 1203 or from the camera 1210.

The calibration module 1203E includes instructions that, when executed, or circuits that, when activated, cause the calibration device 1200 to calculate extrinsic parameters for the camera 1210, for example as described in block B945 in FIG. 9 or in block B1185 in FIG. 11.

The communication module 1203F includes instructions that, when executed, or circuits that, when activated, cause the calibration device 1200 to communicate with one or more other devices, for example the camera 1210.

The camera 1210 includes one or more processors 1211, one or more I/O interfaces 1212, storage 1213, a communication module 1213A, and an image-capturing assembly 1214. The image-capturing assembly 1214 includes one or more image sensors, one or more lenses, and an aperture. The communication module 1213A includes instructions that, when executed, or circuits that, when activated, cause the camera 1210 to receive a request for an image from a requesting device, retrieve a requested image from the storage 1213, or send a retrieved image to the requesting device (e.g., the calibration device 1200).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A system comprising:
   two or more cameras;
   a rotating stage, which has an axis of rotation;
   one or more computer-readable media; and
   one or more processors that are coupled to the one or more computer-readable media, the rotating stage, and the two or more cameras and that are configured to cause the system to
      control the two or more cameras to capture respective images of a calibration target in a first pose, wherein the calibration target is positioned on the rotating stage;
      control the rotating stage to rotate through an angular increment to a second pose;
      control the two or more cameras to capture respective images of the calibration target in the second pose; and
      calculate a transformation between two cameras of the two or more cameras based on the respective images of the calibration target in the first pose, on the respective images of the calibration target in the second pose, and on the angular increment, wherein, to calculate the transformation between the two cameras of the two or more cameras, the one or more processors are further configured to cause the system to calculate a transformation between the first pose and the second pose.

2. A system comprising:
two or more cameras;
a rotating stage, which has an axis of rotation;
one or more computer-readable media; and
one or more processors that are coupled to the one or more computer-readable media, the rotating stage, and the two or more cameras and that are configured to cause the system to
  control the two or more cameras to capture respective images of a calibration target in a first pose, wherein the calibration target is positioned on the rotating stage;
  control the rotating stage to rotate through an angular increment to a second pose;
  control the two or more cameras to capture respective images of the calibration target in the second pose; and
  calculate a transformation between two cameras of the two or more cameras based on the respective images of the calibration target in the first pose, on the respective images of the calibration target in the second pose, on the angular increment, and on an optimization function that uses the angular increment as a constraint.

3. The system of claim 1, wherein the one or more processors are further configured to cause the system to
  control the rotating stage to rotate through the angular increment to a third pose;
  control the two or more cameras to capture respective images of the calibration target in the third pose; and
  calculate the transformation further based on the respective images of the calibration target in the third pose.

4. The system of claim 1, wherein the one or more processors are further configured to cause the system to detect respective locations of one or more reference points on the calibration target in the respective images of the calibration target in the first pose and in the respective images of the calibration target in the second pose.

5. The system of claim 2, wherein the one or more processors are further configured to cause the system to detect respective locations of one or more reference points on the calibration target in the respective images of the calibration target in the first pose and in the respective images of the calibration target in the second pose,
  and wherein the optimization function also uses the respective locations of the one or more reference points on the calibration target in the respective images of the calibration target in the first pose and in the respective images of the calibration target in the second pose as constraints.

6. The system of claim 5, wherein the constraints can be described as follows:

$$\hat{X}_a = R_{\theta_a} \hat{X}_{a-1} + (I - R_{\theta_a}) X_0,$$

$$\hat{X}_0 = R_0 Y + t_0 1^T,$$

$$\|k\|_2 = 1,$$

$$R_{\theta_a} = \exp(i\theta_a [k]_x),$$

$$R_0 \in SO(3), \text{ and}$$

$$R_{c,0} \in SO(3), c = \{0, \ldots, N_c - 1\},$$

where $\hat{X}_a$ denotes estimates of reference-point locations at pose a, where $R_{\theta_a}, t_{\theta_a}$ denotes a transformation from one pose of the calibration target to an adjacent pose of the calibration target, where $X_0$ denotes a point on the axis of rotation of the rotating stage, where $R_0, t_0$ denotes a first pose of the calibration target, where $N_c$ denotes a number of cameras, where k is a unit vector that describes the axis of rotation of the rotating stage, where SO(3) denotes a rotation group, and where Y denotes coordinates of the one or more reference points.

7. The system of claim 6, wherein the optimization function can be described as follows:

$$\operatorname*{argmin}_{\epsilon, R_{0,c}, t_{0,c}} \sum_{c=0}^{N_c-1} \sum_{a \in A_c} \left\| m_{a,c} - \hat{m}_c(R_{c,0} \hat{X}_a + t_{c,0} 1^T) \right\|_F^2,$$

where $A_c$ denotes a set of all poses visible to camera c; where $\hat{m}_c(\bullet)$ denotes a projection of a three-dimensional point onto an image sensor of camera c; where $m_{a,c}$ denotes detected locations of the one or more reference points (in pixels) for camera c at pose a; where $\epsilon$ is a set of parameters k, $X_0$, $R_0$, and $t_0$; and where $R_{i,j}, t_{i,j}$ is a transformation from camera i to camera j.

8. The system of claim 1, wherein, to calculate the transformation between the two cameras of the two or more cameras, the one or more processors are further configured to cause the system to calculate a respective transformation between each of the two cameras and the axis of rotation of the rotating stage.

9. A method comprising:
  obtaining a first image of a calibration target that was captured by a first camera while the calibration target was in a first pose, wherein the calibration target was located on a rotating stage, which rotates about an axis of rotation;
  obtaining a second image of the calibration target that was captured by a second camera while the calibration target was in the first pose;
  obtaining a third image of the calibration target that was captured by the first camera while the calibration target was in a second pose, wherein the second pose is rotated by an angular increment relative to the first pose;
  obtaining a fourth image of the calibration target that was captured by the second camera while the calibration target was in the second pose; and
  calculating a transformation between the first camera and the second camera based on the first image, on the second image, on the third image, on the fourth image, and on the angular increment,
  wherein calculating the transformation between the first camera and the second camera includes calculating a transformation between the first camera and the axis of rotation and includes calculating a transformation between the second camera and the axis of rotation.

10. The method of claim 9, further comprising:
  obtaining a fifth image of the calibration target that was captured by the first camera while the calibration target was in a third pose, wherein the third pose is rotated by the angular increment relative to the second pose, and wherein the third pose is rotated by two times the angular increment relative to the first pose; and obtaining a sixth image of the calibration target that was captured by the second camera while the calibration target was in the third pose,
wherein calculating the transformation is further based on the fifth image and on the sixth image.

11. The method of claim 9, wherein calculating the transformation between the first camera and the second camera includes calculating a transformation between the first pose and the second pose.

12. A method comprising:
obtaining a first image of a calibration target that was captured by a first camera while the calibration target was in a first pose, wherein the calibration target was located on a rotating stage;
obtaining a second image of the calibration target that was captured by a second camera while the calibration target was in the first pose;
obtaining a third image of the calibration target that was captured by the first camera while the calibration target was in a second pose, wherein the second pose is rotated by an angular increment relative to the first pose;
obtaining a fourth image of the calibration target that was captured by the second camera while the calibration target was in the second pose; and
calculating a transformation between the first camera and the second camera based on the first image, on the second image, on the third image, on the fourth image, on the angular increment, and on an optimization function that uses the angular increment as a constraint.

13. One or more non-transitory computer-readable media storing computer-executable instructions that, when executed by one or more computing devices, cause the one or more computing devices to perform operations comprising:
controlling two or more cameras to capture respective images of a calibration target in a first pose, wherein the calibration target is positioned on a rotating stage, wherein the first pose has a first angle, and wherein the rotating stage rotates about an axis of rotation;
controlling the two or more cameras to capture respective images of the calibration target in a second pose, wherein the second pose has a second angle that is different from the first angle; and
calculating a transformation between two cameras of the two or more cameras based on the respective images of the calibration target in the first pose, on the respective images of the calibration target in the second pose, and on a difference between the first angle and the second angle,
wherein calculating the transformation between the two cameras includes calculating a transformation between the first pose and the second pose.

14. The one or more non-transitory computer-readable media of claim 13, wherein calculating the transformation between the two cameras of the two or more cameras includes calculating a respective transformation between each of the two cameras and an axis of rotation of the rotating stage.

15. One or more non-transitory computer-readable media storing computer-executable instructions that, when executed by one or more computing devices, cause the one or more computing devices to perform operations comprising:
controlling two or more cameras to capture respective images of a calibration target in a first pose, wherein the calibration target is positioned on a rotating stage, and wherein the first pose has a first angle;
controlling the two or more cameras to capture respective images of the calibration target in a second pose, wherein the second pose has a second angle that is different from the first angle; and
calculating a transformation between two cameras of the two or more cameras based on the respective images of the calibration target in the first pose, on the respective images of the calibration target in the second pose, on a difference between the first angle and the second angle, and on an optimization function that uses the difference between the first angle and the second angle as a constraint.

16. The method of claim 12, further comprising:
detecting respective locations of one or more reference points on the calibration target in the first image, in the second image, in the third image, and in the fourth image,
wherein the optimization function also uses the respective locations of the one or more reference points on the calibration target as constraints, and
wherein the constraints can be described as follows:

$$\hat{X}_a = R_{\theta_a-1} + (I-R_{\theta_a})X_0,$$

$$\hat{X}_0 = R_0 Y + t_0 1^T,$$

$$\|k\|_2 = 1,$$

$$R_{\theta_a} = \exp(i\theta_a[k]_x),$$

$$R_0 \in SO(3), \text{ and}$$

$$R_{c,0} \in SO(3), c=\{0, \ldots, N_c-1\},$$

where $\hat{X}_a$ denotes estimates of reference-point locations at pose a, where $R_{\theta_a}, t_{\theta_a}$ denotes a transformation from one pose of the calibration target to an adjacent pose of the calibration target, where $X_0$ denotes a point on the axis of rotation of the rotating stage, where $R_0, t_0$ denotes a first pose of the calibration target, where $N_c$ denotes a number of cameras, where k is a unit vector that describes the axis of rotation of the rotating stage, where SO(3) denotes a rotation group, and where Y denotes coordinates of the one or more reference points.

17. The method of claim 12, further comprising:
detecting respective locations of one or more reference points on the calibration target in the first image, in the second image, in the third image, and in the fourth image,
wherein the optimization function can be described as follows:

$$\underset{\varepsilon, R_{0,c}, t_{0,c}}{\operatorname{argmin}} \sum_{c=0}^{N_c-1} \sum_{a \in A_c} \left\| m_{a,c} - \hat{m}_c(R_{c,0}\hat{X}_a + t_{c,0}1^T) \right\|_F^2,$$

where $A_c$ denotes the set of all poses visible to camera c; where $\hat{m}_c(\cdot)$ denotes a projection of a three-dimensional point onto an image sensor of camera c; where $m_{a,c}$ denotes detected locations of the one or more reference points (in pixels) for camera c at pose a; where $\varepsilon$ is a set of parameters k, $X_0$, $R_0$, and $t_0$; where $R_{i,j}, t_{i,j}$ is a transformation from camera i to camera j; where $X_0$ denotes a point on the axis of rotation of the rotating stage; where $R_0, t_0$ denotes a first pose of the calibration target; where $N_c$ denotes a number of cameras; and where k is a unit vector that describes the axis of rotation of the rotating stage.

18. The one or more non-transitory computer-readable media of claim 15, wherein the operations further comprise
detecting respective locations of one or more reference points on the calibration target in the respective images of the calibration target in the first pose and in the respective images of the calibration target in the second pose,
wherein the optimization function also uses the respective locations of the one or more reference points on the calibration target in the respective images of the calibration target in the first pose and in the respective images of the calibration target in the second pose as constraints.

19. The one or more non-transitory computer-readable media of claim 18, wherein the constraints can be described as follows:

$$\hat{X}_a = R_{\theta_a}\hat{X}_{a-1} + (I - R_{\theta_a})X_0,$$

$$\hat{X}_0 = R_0 Y + t_0 1^T,$$

$$\|k\|_2 = 1,$$

$$R_{\theta_a} = \exp(i\theta_a[k]_x),$$

$$R_0 \in SO(3), \text{ and}$$

$$R_{c,0} \in SO(3), c = \{0, \ldots, N_c - 1\},$$

where $\hat{X}_a$ denotes estimates of reference-point locations at pose a, where $R_{\theta_a}, t_{\theta_a}$ denotes a transformation from one pose of the calibration target to an adjacent pose of the calibration target, where $X_0$ denotes a point on the axis of rotation of the rotating stage, where $R_0, t_0$ denotes a first pose of the calibration target, where $N_c$ denotes a number of cameras, where k is a unit vector that describes the axis of rotation of the rotating stage, where $SO(3)$ denotes a rotation group, and where Y denotes coordinates of the one or more reference points.

20. The one or more computer-readable storage media of claim 15, wherein the operations further comprise
detecting respective locations of one or more reference points on the calibration target in the respective images of the calibration target in the first pose and in the respective images of the calibration target in the second pose, and
wherein the optimization function can be described as follows:

$$\operatorname*{argmin}_{\varepsilon, R_{0,c}, t_{0,c}} \sum_{c=0}^{N_c-1} \sum_{a \in A_c} \left\| m_{a,c} - \hat{m}_c\left(R_{c,0}\hat{X}_a + t_{c,0}1^T\right) \right\|_F^2,$$

where $A_c$ denotes the set of all poses visible to camera c; where $\hat{m}_c(\bullet)$ denotes a projection of a three-dimensional point onto an image sensor of camera c; where $m_{a,c}$ denotes detected locations of the one or more reference points (in pixels) for camera c at pose a; where $\epsilon$ is a set of parameters k, $X_0$, $R_0$, and $t_0$; where $R_{i,j}, t_{i,j}$ is a transformation from camera i to camera j; where $X_0$ denotes a point on the axis of rotation of the rotating stage; where $R_0, t_0$ denotes a first pose of the calibration target; where $N_c$ denotes a number of cameras; and where k is a unit vector that describes the axis of rotation of the rotating stage.

21. A method comprising:
obtaining a first image of a calibration target that was captured by a first camera while the calibration target was in a first pose, wherein the calibration target was located on a rotating stage, which rotates about an axis of rotation;
obtaining a second image of the calibration target that was captured by a second camera while the calibration target was in the first pose;
obtaining a third image of the calibration target that was captured by the first camera while the calibration target was in a second pose, wherein the second pose is rotated by an angular increment relative to the first pose;
obtaining a fourth image of the calibration target that was captured by the second camera while the calibration target was in the second pose;
detecting respective locations of one or more reference points on the calibration target in the first image, in the second image, in the third image, and in the fourth image; and
calculating a transformation between the first camera and the second camera based on the first image, on the second image, on the third image, on the fourth image, and on an optimization function that uses the respective locations of the one or more reference points on the calibration target as constraints.

22. The method of claim 21, wherein the optimization function also uses the angular increment as a constraint.

* * * * *